United States Patent [19]
Schade

[11] 3,935,165
[45] Jan. 27, 1976

[54] PROCESS FOR THE STABILIZATION OF POLYESTER AMIDES

[75] Inventor: Gerhard Schade, Witten, Germany

[73] Assignee: Dynamit Nobel Aktiengesellschaft, Troisdorf, Germany

[22] Filed: Apr. 24, 1974

[21] Appl. No.: 463,917

Related U.S. Application Data

[63] Continuation-in-part of Ser. No. 380,423, July 18, 1973, abandoned.

[30] Foreign Application Priority Data

Apr. 26, 1973 Germany.......................... 2321120
July 22, 1972 Germany.......................... 2236041

[52] U.S. Cl..................... 260/45.85 B; 260/45.7 P; 260/45.7 PH; 260/45.95 H
[51] Int. Cl.$^2$.......................................... C08G 6/00
[58] Field of Search............. 260/45.95 H, 47.7 P, 45.7 PH, 260/45.85 B

[56] References Cited
UNITED STATES PATENTS

| | | | |
|---|---|---|---|
| 3,422,030 | 1/1969 | Riley........................... | 260/45.95 H |
| 3,533,986 | 10/1970 | Davy............................ | 260/45.7 PH |
| 3,629,226 | 12/1971 | Lohse et al................... | 260/45.95 H |
| 3,666,717 | 5/1972 | Davy et al..................... | 260/45.7 P |
| 3,676,393 | 7/1972 | Piirma.......................... | 260/45.7 P |

*Primary Examiner*—V. P. Hoke
*Attorney, Agent, or Firm*—Burgess, Dinklage & Sprung

[57] ABSTRACT

A stabilized polyamide composition comprising a random polyester amide containing the following moieties:

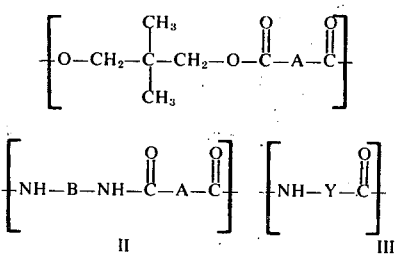

where A is an aliphatic, cycloaliphatic or aromatic residue or mixtures therof, B is an aliphatic or cycloaliphatic residue or mixtures thereof, and Y is an aliphatic or cycloaliphatic residue, the moieties I being present in an amount of 20 to 80 mole percent, the structural moieties II, III or mixtures thereof being present in an amount of 80 to 20 mole percent, and:
  A. phosphorous acid, an alkyl or aryl ester thereof,
  B. triphenylphosphine, and
  C. a sterically impeded phenol;
a process for the stabilization of a polyester amide obtained by the melt condensation of 2,2-dimethylpropanediol,1,3, cycloaliphatic and/or aliphatic, diprimary diamines and dicarboxylic acids and/or ω-aminocarboxylic acids or lactams thereof which contain hexamethylene diammonium adipate in the structure which comprises carrying out the condensation in the presence of a stabilizer which comprises:
  A. phosphorous acid, or an alkyl or aryl ester thereof,
  B. triphenylphosphine, and
  C. a sterically impeded phenol.

6 Claims, No Drawings

PROCESS FOR THE STABILIZATION OF POLYESTER AMIDES

CROSS REFERENCE TO RELATED APPLICATION

This application is a continuation-in-part of copending application Ser. No. 380,423 of July 18, 1973, now abandoned, the disclosure of which is hereby incorporated herein by reference.

BACKGROUND OF THE INVENTION

1. Field of the Invention

This invention relates to the stabilization of polyester amides prepared by the melt condensation of 2,2-dimethylpropanediol, cycloaliphatic and/or aliphatic, diprimary diamines and dicarboxylic acids and/or ω-aminocarboxylic acids or lactams. More particularly, the present invention relates to the stabilization of such polyester amides against the formation of a skin. This invention also relates to the stabilization of such polyester amides against discoloration.

2. Discussion of the Prior Art

In parent application Ser. No. 380,423 there is described a process for preparing polyester amides which are not readily discolored and are of a clear or semi-clear nature by heating in the melt an aliphatic or cycloaliphatic diamine, 2,2-propanediol and an aliphatic or aromatic dicarboxylic acid and/or a cycloaliphatic or aliphatic ω-aminocarboxylic acid or precursor thereof. The polyester amides so obtained have good color stability and are generally clear or semi-clear in nature. Unfortunately, it has been found that some polyester amides obtained by such polymerization do not have the desired melt stability for application as thermoplastic adhesives especially when the polyester amide is mainly or exclusively of hexamethylene diammonium adipate ("AH salt"). This is especially the case when the product is held in the melted state in open, heated reservoirs from which it is pumped as required to some kind of application apparatus such as injection nozzles, applicator rolls, cylinders, spray guns and the like. This seriously impairs the ability of the polyester amide to be used as a thermoplastic adhesive. In such cases where the polyester amide is maintained in the melted state in an open, heated reservoir a skin of infusible and insoluble matter forms to a greater or lesser extent on the surface of the melt, depending on the length of exposure to the air.

When fresh polyester amide is added to the reservoir, this skin is easily broken up and migrates in the form of solid or slimy particles into the interior of the melt and from there into the lines of the applicator devices and on to the latter, thereby disturbing the uniform application of the melt or even completely interrupting the flow of material. This necessitates difficult and expensive cleaning operations. For this reason it has become desirable to prevent the formation of skin under the above-described conditions or at least to retard such skin formation to such an extent that it will cease to be a problem.

Surprisingly, the undesirable skin formation does not occur in the polyesters of Ser. No. 380,423, even in the absence of any stabilizers, if the amide groups contained in them originate from an aminocarboxylic acid or lactam thereof which does not give rise to formation of AH salt. The sole or predominant use of AH salt in the preparation of polyamides, however, is often advantageous because the polyester amides thereby obtained crystallize substantially faster upon the cooling of the melt than those which contain amino acids condensed into their structure instead of AH salt, especially epsilon-aminocapronic acid or caprolactam. The greater speed of crystallization results in a more rapid setting of the adhesive compositions. This more rapid setting in turn permits the performance of a greater number of adhesion operations per unit time, which is often desirable or necessary for the purpose of increasing output. Consequently, the stabilization of polyester amides containing AH salt condensed into their structure so as to prevent the formation of skin when the polyester is heated and exposed to air is an economically important objective.

Another important consideration in the stabilization of polyester amides containing AH salt condensed into their structure is the requirement that the products be as light in color as possible and remain so. This requirement is established because the adhesive when squeezed out of the joint formed when objects are glued together should not be so visible as to noticeably and visibly stain the area of the joint.

It has, therefore, become a desirable to provide a stabilizer composition which stabilizes a polyester amide, especially one containing AH salt within the structure, against the formation of a film due to the adverse effect of air when the polyester is heated. It is also desirable to provide such a stabilizer composition which will impart rare light stability to the polyester amide.

SUMMARY OF THE INVENTION

The long felt desires in the field of polyester amides are satisfied by a stabilized polyester amide composition which comprises a random polyester amide containing the following moieties:

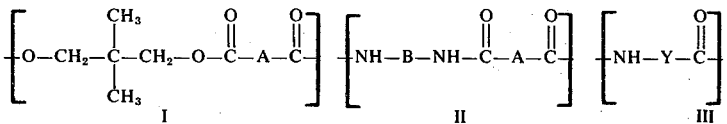

where A is an aliphatic, cycloaliphatic or aromatic residue or mixtures thereof, B is an aliphatic or cycloaliphatic residue or mixtures thereof, and Y is an aliphatic or cycloaliphatic residue, the moieties I being present in an amount of 20 to 80 mole percent, the structural moieties II, III or mixtures thereof being present in an amount of 80 to 20 mole percent, and a stabilizer composition consisting essentially of:

A. a phosphorous acid, an alkyl or aryl ester thereof,
B. triphenylphosphine; and
C. a sterically impeded phenol.

At the heart of the present invention there is the use of a three component stabilizer composition to retard formation of a skin on the surface of the melt of polyester amide. While the three components of the stabilizer composition are all individually known and have been known to be employed in certain combinations with one another it has not heretofore been proposed to provide a stabilizer composition of these three classes of components together. Moreover, it is not known heretofore to use this combination of stabilizers against the thermal-oxidative decomposition of polyesters, polyamides or polyester amides.

While it is known that oxidation of polyamides leads to cross-linking and that this cross-linking reaction may be inhibited by the presence of antioxidants (V. V. Korshak, T. M. Frunze, "Synthetic Hetero-Chain Polyamides," Israel Program for Scientific Translations, Jerusalem 1964, p. 279), it has not been heretofore suggested that the three component stabilizer composition of the present invention can be used to retard or eliminate the formation of skin on a polyester amide which skin might be formed due to the effect of oxygen upon the polyamides at such elevated temperatures. It is common knowledge that each of the components A to C can be considered as an antioxidant. However, it was surprising to find that they do not produce the desired stabilizing effect individually or in a combination of any two. Thus, to provide stabilization against film formation it is necessary that all three components, A to C, be simultaneously present. Such factor could not have been predicted from the prior art.

DESCRIPTION OF SPECIFIC EMBODIMENTS

The stabilized random polyester amide composition contains generally between 0.1 to 0.5 weight percent stabilizer based upon the total weight of the polyester amide-forming starting materials. Preferably, the amount of stabilizer is between 0.15 and 0.35 weight percent based upon the total weight of the polyester amide forming starting materials. The reason that the weight of stabilizer is based upon the combined weight of the starting materials rather than the final product is that the stabilizer components are preferably added to the polyester amide during the formation of the polyester amide itself in the condensation reaction. Generally speaking, however, the amount of stabilizer on the basis of the weight of the final polyester amide is within the broad range of 0.11 to 0.6 weight percent and within the preferred range of 0.17 to 0.7 weight percent.

Each of the components of A to C can be varied independent of the other components of the stabilizer composition. Generally speaking, components A to C are used in a weight ratio of approximately 1:1:1 to about 0.5:0.5:2. Preferably, the components are present in a ratio between 1 : 2 : 2 to 1 : 1 : 2. The above ratios are weight ratios and are based upon component A being in the form of phosphorous acid.

It is also possible to increase the concentration of components A and C individually or together to approximately ten times the values stated without incurring disadvantages, although no special advantage is obtained.

The selection of a sterically impeded phenol is conspicuously uncritical. The following compounds have been used with virtually equal success:
2-methyl-6-tert.-butylphenol
2,6-di-tert-butyl-p-cresol
2,2'-methylenebis-(4-methyl-6-tert.-butylphenol)
2,6-diisopropylphenol
4,4'-methylenebis-(2,6-ditert.-butylphenol)
β-(3,5-ditert.-butyl-4-hydroxyphenyl)-propionic acid ester of pentaerythritol
2,6-ditert.-butylphenol These phenols have the general formula:

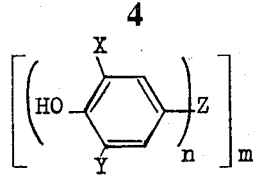

X, Y = H or linear or branched alkyl residues having 1 to 4 C-atoms

Z = H or linear or branched alkyl residues having 1 to 4 C-atoms or an alkylidene monocarboxylic acid having 2 to 6 C-atoms, esterified with mono-to tetraalkohols having 1 to 5 C-atoms; $n = 1$ to 3, $m = 1$ to 4, corresponding to the valency of the esterified alcohols, restricted by the demand, that the benzene nucleus in the formula given is substituted by no more than 3 H-atoms, and that X or Y and Z are interchangeable.

Additional representatives of this class of substances may be seen in the book by J. Voigt: "Die Stabilisierung der Kunststoffe gegen Licht und Wärme," Springer-Verlag, Berlin-Heidelberg 1966, pp. 595–614, and other sources.

Component A can be phosphorous acid or any desired ester of this acid especially those esters which can readily undergo hydrolysis to form the phosphorous acid. It is assumed that during polycondensation or use of the phosphorous acid ester a hydrolytic cleavage occurs resulting in the formation of the free acid and the corresponding hydroxy compounds. This is apparent from the fact that, beginning at a certain molecular concentration of component A, similar decomposition phenomena occur to the same extent than the polyester amide during its preparation, which can probably be attributed to a common cause, i.e., the presence of free phosphoric acid. Thus, it matters not whether component A consists of the acid itself or any desired trialkyl or triaryl phosphite in an amount equimolecular to this acid. Preferably, when component A is supplied by an alkyl ester thereof the alkyl group contains between 1 and 9 carbon atoms. If a triaryl phosphite is employed it is preferred that the aryl groups have six carbon atoms in the ring.

The maximum amount of component A, with reference to its phosphorous acid content, amounts to approximately 0.16 weight percent with a total weight of the polyester amide-forming starting materials. In the case of higher concentrations, undesirable discolorations occur in the final product.

It is preferred, in carrying out the process of the invention, to add the stabilizers A to C to the polyester amide monomer mixture since then the stabilizing action is optimum insofar as inherent color and the thermal-oxidative stability of the polymer is concerned. However, the addition of a portion of the stabilizers at an advanced stage of the polyester amide preparation can also be done.

In order to more fully illustrate the nature of the invention and the manner of practicing the same the following examples are presented. In the examples the reduced viscosity η red, was determined by the method described in W. R. Sorenson and T. W. Campbell, "Preparative Methods of Polymer Chemistry," Interscience Publishers, Inc., New York, 1961, pp. 38–40, in m-cresol at 30°C. and at a concentration of 1 g of polymer in 100 ml. of solvent.

The color of the melted polymers was measured with a Lovibond Tintometer of Tintometer Ltd., Salisbury (Great Britain) and has been expressed in values of the "Lovibond Scale". This scale consists of sets of glass filters with linearly graded transmittance for the colors red, yellow and blue. By suitably combining these three substractive primary colors any desired tint may be matched and can be numerically identified. The method used is described in detail in two brochures of Tintometer Ltd. entitled, "Colorimetric Chemical Analytical Methods."

The skin formation was determined by placing 50 g. of polymer in 150 ml. beakers and keeping the beakers at 180°C. in a circulating-air drying oven. By moving a glass rod horizontally through the surface of the melt the time was determined which elapsed before the first signs of the formation of a skin became perceptible (Time I) and the time which elapsed before the surface was entirely covered with a skin (Time II).

In the following examples the procedure was always as follows:

52.56 G. of adipic acid, 37.56 g. of 2,2-dimethyl-propanediol-1,3, 40.0 g. of hexamethylenediammoniumadipate (AH salt) and 130 mg. of octyleneglycol titanate (reaction product obtained by the reaction of 1 mole of tetrabutyl titanate with 4 moles of 2-ethylhexanediol-1,3 with removal by distillation of the butanol that formed) were heated continuously within 3 hours from 150° to 270°C. at normal pressure under nitrogen in a 250 mol. round flask with stirrer and descending condenser, in the presence of the specified amounts of stabilizers A to C, and the water of reaction was driven off. Then at 270°C. a vacuum was applied which was increased continuously over a period of 1 hour from 760 to 10 Torr. Then the vacuum of 10 Torr was maintained for another 2 hours at 270°C., and then the product was allowed to solidify in the flask under nitrogen. The contents of the flask was isolated by breaking the flask. The following results were obtained.

| Ex. No. | Stabilizer (mg) | | | $\eta$ red. | Lovibond color | | | Forming of skin (Std.)(hrs) | |
|---|---|---|---|---|---|---|---|---|---|
| | A | B | C | | red | yellow | blue | I | II |
| 1 | — | — | — | 0.59 | 2.0 | 15 | 0.3 | 5 | 8 |
| 2 | 240[1] | — | — | 0.63 | 4.0 | 30 | 1.0 | 7 | 13 |
| 3 | 160[1] | — | — | 0.56 | 4.0 | 10 | 2.0 | 6 | 15 |
| 4 | 80[1] | — | — | 0.58 | 2.0 | 10 | 0.4 | 6 | 14 |
| 5 | 900[2] | — | — | 0.65 | 3.8 | 35 | 1.0 | 6 | 14 |
| 6 | 600[2] | — | — | 0.60 | 4.0 | 10 | 1.8 | 6 | 14 |
| 7 | 300[2] | — | — | 0.60 | 1.8 | 10 | 0.6 | 6 | 15 |
| 8 | — | 500 | — | 0.58 | 1.8 | 10 | 0.2 | — | — |
| 9 | — | 200 | — | 0.63 | 2.0 | 10 | 0.3 | 6 | 10 |
| 10 | — | 100 | — | 0.60 | 2.0 | 9 | 0.2 | 6 | 14 |
| 11 | — | 50 | — | 0.57 | 2.0 | 20 | 0.1 | — | — |
| 12 | — | — | 500[3] | 0.60 | 2.1 | 20 | 0.3 | 13 | 15 |
| 13 | — | — | 200[3] | 0.58 | 2.0 | 10 | 0.2 | — | — |
| 14 | — | — | 100[3] | 0.63 | 1.7 | 9 | 0.4 | 10 | 12 |
| 15 | — | — | 70[3] | 0.61 | 2.0 | 9 | 0.1 | — | — |
| 16 | — | — | 100[4] | 0.63 | 1.8 | 10 | 0.3 | 9 | 12 |
| 17 | — | — | 100[5] | 0.57 | 2.0 | 10 | 0.4 | 10 | 13 |
| 18 | 160[1] | 200 | — | 0.58 | 3.2 | 20 | 2.1 | 6 | 10 |
| 19 | 50[1] | 80 | — | 0.60 | 2.1 | 10 | 1.1 | 6 | 10 |
| 20 | — | 100 | 100[4] | 0.63 | 5.4 | 25 | 2.1 | 10 | 13 |
| 21 | — | 200 | 130[5] | 0.57 | 3.5 | 26 | 2.4 | 9 | 12 |
| 22 | 160[1] | — | 100[4] | 0.58 | 3.2 | 20 | 4.2 | 10 | 16 |
| 23 | 80[1] | — | 80[4] | 0.62 | 2.1 | 10 | 1.1 | 9 | 15 |
| 24 | 160[1] | — | 500[4] | 0.59 | 5.0 | 20 | 4.2 | 10 | 14 |

Examples 1 to 24 contain stabilizers A to C either individually or in combinations of two. It can be seen that the time that elapses before skin formation begins can at best be doubled, substantially independently of their concentration, but in these cases a deterioration of color must be tolerated.

| Ex.No. | Stabilizer (mg) | | | $\eta$ red. | Lovibond color | | | Forming of skin (hrs) | |
|---|---|---|---|---|---|---|---|---|---|
| | A | B | C | | red | yellow | blue | I | II |
| 25 | 200[1] | 200 | 200[5] | 0.69 | 4.1 | 20 | 3.1 | >20 | >20 |
| 26 | 200[1] | 200 | 100[5] | 0.58 | 4.1 | 15 | 3.0 | >20 | >20 |
| 27 | 200[1] | 200 | 70[5] | 0.60 | 4.1 | 15 | 3.1 | >20 | >20 |
| 28 | 100[1] | 200 | 200[5] | 0.59 | 3.5 | 12 | 2.8 | >20 | >20 |
| 29 | 100[1] | 100 | 100[5] | 0.63 | 4.1 | 10 | 3.1 | >20 | >20 |
| 30 | 50[1] | 50 | 100[5] | 0.65 | 3.3 | 10 | 1.3 | 15 | >20 |
| 31 | 550[6] | 100 | 100[5] | 0.62 | 3.8 | 11 | 2.5 | >20 | >20 |
| 32 | 200[1] | 240 | 100[7] | 0.57 | 2.1 | 12 | 1.0 | 16 | >20 |
| 33 | 100[1] | 150 | 200[8] | 0.60 | 0.9 | 10 | 0.8 | >20 | >20 |
| 34 | 200[1] | 240 | 1300[8] | 0.60 | 3.6 | 10 | 2.3 | >20 | >20 |
| 35 | 160[1] | 100 | 160[4] | 0.58 | 4.0 | 11 | 2.2 | 18 | >20 |
| 36 | 200[1] | 200 | 250[9] | 0.63 | 0.8 | 10 | 0.9 | >20 | >20 |

1) Phosphorous acid
2) Triphenylphosphite
3) 2-methyl-t-tert.-butylphenol
4) 2,6-diisopropylphenol
5) 4,4'-methylenebis-(2,6-ditert.-butylphenol)
6) Trinonylphosphite
7) 2,2'-methylenebis-(4-methyl-6-tert.-butylphenol)
8) β-(3,5-ditert.-butyl-4-hydroxyphenyl)-propionic acid ester of pentaerythritol
9) 2,6-ditert.-butylphenol Examples 25 to 36 show the superiority of the simultaneous use of stabilizers A, B and C with regard to retarding skin formation and retaining the light color of the product when the melt is exposed to oxidation.

When the 2,2-dimethylpropanediol-1,3 in the polyester amides was replaced, contrary to the teaching of Ser. No. 380,423 by an equivalent amount of ethylene glycol, and the catalyst octyleneglycoltitanate was simultaneously replaced with 60 mg. of $GeO_2$ in consideration of the known fact that polyesters containing ethylene glycol condensed into their structure are as a rule discolored yellowish brown by the use of catalysts containing titanium, it was not possible by the use of any of the stabilizer combinations named in Examples 25 to 36 to achieve Lovibond color numbers (red, yellow, blue) better than 5/40/3.

In like manner, better color numbers were not obtained by replacing the 2,2-dimethylpropanediol-1,3 in the preparation of the polyester amide, with an equivalent amount of 1,4-butanediol and bringing the polycondensation temperature back to 245°C; at this temperature the speed of the thermal decomposition of titanium-catalyzed polyesters of 1,4-butanediol is approximately equal to the speed of the thermal decomposition of germanium-catalyzed polyesters of ethylene glycol at 270°C., so that any effects which this choice of temperature might produce, and which, though negligible, are undesirable in this connection, were unable to obscure the situation under study. It appears from the experiments that stabilizer combinations of A, B and C may be applied advantageously only to those polyester amides which are described in Ser. No. 380,423.

In the text above there has been set forth a generic formula for the random polyester amide which can be stabilized by the three component stabilizer composition of the present invention. It will be understood that the stabilizer technique is particularly useful for those random polyester amides containing an AH salt or AH salt residue. It is also to be understood that preferred polyester amides falling within that definition can also be stabilized in accordance with the present invention. This includes instances where the amount of ester groups based upon the combined amount of amide groups is less than 20% as well as instances where the amount of ester groups is between 20 and 80%. It is to be understood, of course, that while the moiety A can be aliphatic, cycloaliphatic or an aromatic residue or mixture thereof it is preferred that that residue be an aliphatic residue and especially an alkyl residue of between 4 and 10 carbon atoms. Similarly when the residue A is a cycloalkane or phenylene it is preferred that it contained 6 or 12 carbon atoms in the ring.

The residue B is desirably a residue of 2,2,4 or 2,4,4-trimethylhexamethylenediamine or a mixture thereof. It is to be understood, however, that this residue can be a straight chain alkane having between 4 and 12 carbon atoms in the chain. The polyester amides are most desirably ones wherein all alcoholic monomeric residues have the formula:

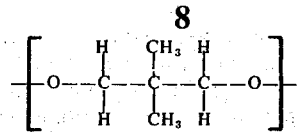

What is claimed is:

1. A stabilized polyester amide composition comprising a random polyester amide containing the following moieties:

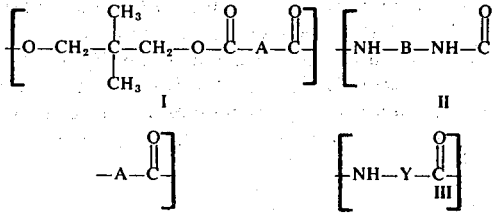

where A is an aliphatic, cycloaliphatic or aromatic residue or mixtures thereof, B is an aliphatic or cycloaliphatic residue or mixtures thereof, and Y is an aliphatic or cycloaliphatic residue, the moieties I being present in an amount of 20 to 80 mole percent, the structural moieties II, III or moieties thereof being present in an amount of 80 to 20 mole percent, and a stabilizer composition consisting essentially of:
  A. phosphorous acid, or an alkyl or aryl ester thereof,
  B. triphenylphosphine; and
  C. a sterically impeded phenol,
wherein the total weight of stabilizer composition is between 0.1 and 0.5 weight percent, based upon the combined total amount of polyester amide-forming starting materials and the weight ratio of the components A:B:C is within the following range: 0.5–10:1-:1–40.

2. A stabilized composition according to claim 1 wherein the weight ratio of the components A to C is within the following range: 1:1:1 to about 0.5:0.5:2, said ratio based upon the weight ratio calculated as if component A were phosphorous acid.

3. A stabilized polyester amide composition according to claim 2 wherein the sterically impeded phenol is selected from the group consisting of:
  2-methyl-6-tert.-butylphenol
  2,6-di-tert-butyl-p-cresol
  2,2'-methylenebis-(4-methyl-6-tert.-butylphenol)
  2,6-diisopropylphenol
  4,4'-methylenebis-(2,6-ditert.-butylphenol)
  β-(3,5-ditert.-butyl-4-hydroxyphenyl)-propionic acid ester of pentaerythritol
  2,6-ditert.-butylphenol.

4. A stabilized polyester amide composition according to claim 3 wherein component A is phosphorous acid.

5. A stabilized composition according to claim 3 wherein component A is an alkyl ester of phosphorous acid wherein the alkyl portion has 1 to 9 carbon atoms.

6. A stabilized polyester amide composition according to claim 3 wherein component A is an aryl ester of phosphorous acid and the aryl radical contains 6 carbon atoms in the ring.

* * * * *

UNITED STATES PATENT AND TRADEMARK OFFICE
CERTIFICATE OF CORRECTION

PATENT NO. : 3,935,165
DATED : January 27, 1976
INVENTOR(S) : Gerhard Schade

It is certified that error appears in the above–identified patent and that said Letters Patent are hereby corrected as shown below:

Column 6, line 50, "ired." should read -- $\eta$ red. --.

Signed and Sealed this

Tenth Day of August 1976

[SEAL]

Attest:

RUTH C. MASON
Attesting Officer

C. MARSHALL DANN
Commissioner of Patents and Trademarks